United States Patent [19]

Gneiss et al.

[11] Patent Number: 4,538,456

[45] Date of Patent: Sep. 3, 1985

[54] METHOD AND APPARATUS FOR PREVENTING DAMAGE BY OVERHEATING TO AN AIR FLOW RATE METER RESISTOR

[75] Inventors: Heinz Gneiss, Ludwigsburg; Werner Wünsch, Markgroningen, both of Fed. Rep. of Germany

[73] Assignee: Robert Bosch GmbH, Stuttgart, Fed. Rep. of Germany

[21] Appl. No.: 486,762

[22] Filed: Apr. 20, 1983

[30] Foreign Application Priority Data

Jul. 24, 1982 [DE] Fed. Rep. of Germany ....... 3227807

[51] Int. Cl.³ ................................................ G01F 1/68
[52] U.S. Cl. ....................................................... 73/204
[58] Field of Search .................... 73/118, 204; 123/494

[56] References Cited

U.S. PATENT DOCUMENTS

| | | |
|---|---|---|
| 4,196,622 | 4/1980 | Peter . |
| 4,341,114 | 7/1982 | Plapp ................................ 73/204 X |
| 4,357,829 | 11/1982 | Kraus .................................... 73/204 |
| 4,420,971 | 12/1983 | Rapps ................................ 73/204 X |

Primary Examiner—Herbert Goldstein
Attorney, Agent, or Firm—Edwin E. Greigg

[57] ABSTRACT

A method for preventing damage to a temperature-dependent resistor disposed in a flow cross section caused by overheating as a result of the ignition of a combustible, gaseous mixture during a burn-off procedure is proposed. A heating resistor is disposed in the flow cross section in the vicinity of the temperature-dependent resistor which is supplied with heating current by an electronic regulating circuit in such a manner that during the measuring operation the heating resistor has no current flowing through it, while immediately following the termination of the measuring operation but prior to the initiation of the burn-off procedure at the temperature-dependent resistor, the heating resistor experiences a flow of electric current through it, which heats it to an elevated temperature at which any combustible gases located in its vicinity ignite and burn.

4 Claims, 2 Drawing Figures

METHOD AND APPARATUS FOR PREVENTING DAMAGE BY OVERHEATING TO AN AIR FLOW RATE METER RESISTOR

BACKGROUND OF THE INVENTION

The invention is based on an air flow rate meter as defined generally hereinafter. An air flow rate meter is already known (German Offenlegungsschrift 27 50 050) in which deposits occur on the surface of the temperature-dependent resistor, which is embodied as a hot wire, when it is used for measuring the mass of air aspirated by an internal combustion engine. As a result, the accuracy and speed of the measurement are both impaired. In this known air flow rate meter, it is accordingly provided that at certain times, for instance immediately after the ignition has been shut off, a burn-off procedure is performed, during which the deposits on the temperature-dependent resistor burn off as a result of an increase in the temperature of the resistor brought about by supplying a higher current to it. However, in so doing it cannot be precluded that a rich fuel-air mixture may be located in the intake tube in the vicinity of the temperature-dependent resistor and as a consequence may then ignite at the red-hot resistor during the burn-off procedure, especially under the catalytic influence of a temperature-dependent resistor fabricated from platinum wire. The result is a further, undesirable increase of temperature at the temperature-dependent resistor, which may cause the destruction of the temperature-dependent resistor.

OBJECT AND SUMMARY OF THE INVENTION

The method according to the invention and the air flow rate meter according to the invention and as disclosed hereinafter has the advantage over the prior art that during the burn-off procedure of the temperature-dependent resistor, only very small quantities, if any, of combustible mixture are located in the vicinity of the temperature-dependent resistor, thus preventing the destruction of the temperature-dependent resistor as a consequence of overheating.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
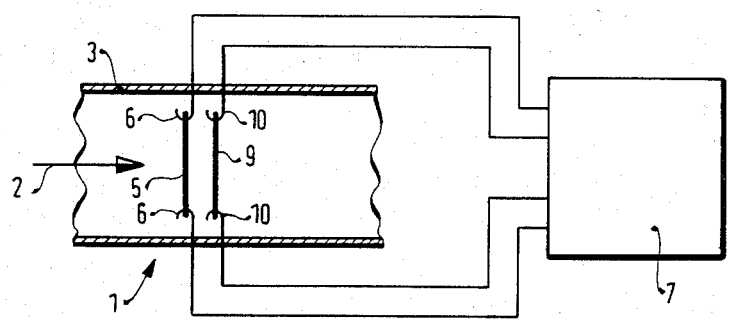
FIG. 1, in simplified form, shows an air flow rate meter apparatus in the intake tube of an internal combustion engine.

The exemplary embodiment of an air flow rate meter shown in FIG. 1 is used, for example, in in internal combustion engine having a fuel injection system. The air for combustion which is aspirated by the engine flows in the direction of the arrow 2 through an air filter (not shown) into an intake tube section 3 forming a flow cross section. To ascertain the mass of air aspirated by the engine, the air flow rate meter 1 has a temperature-dependent resistor 5, which is embodied as a hot wire or hot strip. The hot wire 5 is supported via holder elements 6 in the flow cross section 3 such that it is insulated both thermally and electrically. The hot wire 5 is stretched out at least partially crosswise in the flow cross section 3. The measurement signal of the hot wire 5 is evaluated by an electronic regulating circuit 7, which likewise regulates the hot wire 5 to a constant temperature. Such a regulating circuit is of a known design and may be implemented, for example, by the regulating circuit 23 disclosed in U.S. Pat. No. 4,420,971, having the same assignee as the present invention, and also by the regulating circuit disclosed in U.S. Pat. No. 4,414,847 (Ser. No. 286,344 filed July 23, 1981) and assigned to Nippon Soken, Inc., which patents are incorporated hereby by reference. Deposits on the hot wire cause an incorrect measurement value and retard the speed of measurement. It is therefore provided in a known manner that the hot wire be triggered by the electronic regulating circuit 7 at certain times, for instance when the ignition is shut off, such that it experiences the flow through it of an increased electric current and heats up to a temperature of approximately 1000° C., so that the deposits on the surface of the hot wire 5 will burn off.

Figure 2:
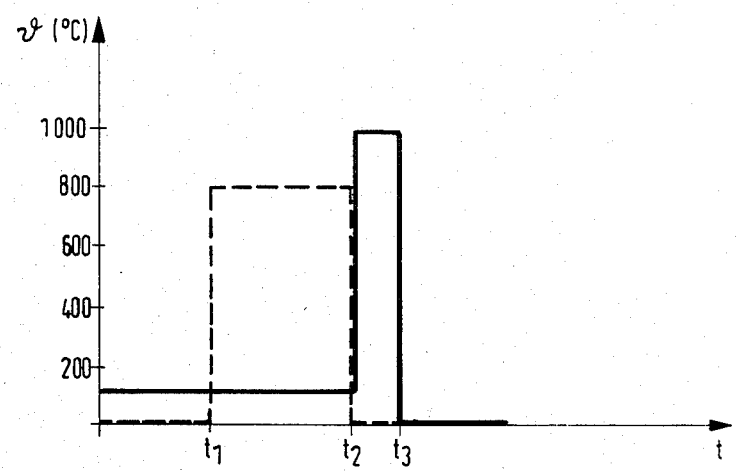
FIG. 2 is a diagram showing the relationship over time between a burn-off procedure at the temperature-dependent resistor and a heating procedure at the heating resistor according to FIG. 1.

In FIG. 2, the temperature status of the hot wire 5 is plotted, with a solid line, over the time t. Up to time $t_2$, the hot wire 5 is regulated by the electronic regulating circuit 7 to a constant temperature, for instance 100° C. At time $t_1$, the ignition of the engine is shut off and the measuring process performed by the air flow rate meter is thus terminated. In accordance with the invention, a solid heating wire 9 is disposed in the vicinity of the hot wire 5; this heating wire 9 may likewise be stretched out between holder elements 10 in the flow cross section 3 and supplied with a heating current by means of the electronic regulating circuit 7. The supply of current to the heating wire 9 by the electronic regulating circuit 7 is such that during the measuring operation performed by the air flow rate meter 1, that is, up to time $t_1$, the heating wire 9 has no current flowing through it. Directly following the end of the measuring operation at time $t_1$, the heating wire 9 is supplied with a heating current by means of the electronic regulating circuit 7, resulting in the establishment of a temperature at the heating wire 9 of approximately 800° C. as indicated by the dashed line in FIG. 2; any combustible mixture located in the vicinity of the heating wire 9 and thus of the hot wire 5 thus ignites and burns. Only upon the attainment of time $t_2$, then, is the burn-off procedure initiated at the hot wire 5 by means of the electronic regulating circuit 7. In the course of this burn-off procedure, deposits on the surface of the hot wire 5 burn off until time $t_3$. Simultaneously with the attainment of time $t_2$, at the onset of the burn-off procedure, the heating current to the heating wire 9 can be interrupted; in any event, this is accomplished by time $t_3$ at the latest. In other words, the heating wire 9 should be switched over to a current-free state by the end of the burn-off procedure.

As a result of the disposition of the heating wire 9 and control of the electrical current supplied to it in accordance with the invention, overheating of the hot wire 5 during the burn-off procedure is prevented.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for preventing damage to a temperature-dependent resistor of an air flow rate meter disposed in a flow cross section caused by overheating as a result of the ignition of a combustible, gaseous mixture during a burn-off procedure for burning off deposits from the surface of said temperature-dependent resistor, comprising the steps of:

disposing a heating resistor in the vicinity of said temperature-dependent resistor;

applying a heating current to said heating resistor after the termination of the measuring operation of the temperature-dependent resistor at specific engine conditions to a temperature at which any combustible gases located in its vicinity ignite and burn, and subsequently heating said temperature-dependent resistor to its burn-off temperature.

2. A method as defined by claim 1, wherein said heating current to the heating resistor is interruptable before the initiation of said burn-off procedure at said temperature-dependent resistor.

3. An air flow rate meter having a temperature-dependent resistor disposed in a flow cross section for ascertaining the mass of said flowing air, wherein at specific engine conditions a burn-off procedure is triggered at said temperature-dependent resistor for burning off deposits from said surface of the temperature-dependent resistor, comprising a heating resistor disposed in said flow cross section in the vicinity of said temperature-dependent resistor, a circuit means connected to said heating resistor, and said circuit means supplying after the termination of the measuring operation of the temperature-dependent resistor at said specific engine conditions a heating current to said heating resistor to a temperature at which any combustible gases located in its vicinity ignite and burn and after a delay said means heating said temperature-dependent resistor to its burn-off temperature.

4. An air flow rate meter as defined by claim 3, wherein said heating current to said heating resistor is interruptable by said circuit means before the initiation of said burn-off procedure at said temperature-dependent resistor.

* * * * *